US012681589B2

(12) United States Patent
Byun

(10) Patent No.: US 12,681,589 B2
(45) Date of Patent: Jul. 14, 2026

(54) STYLUS PEN HAVING A FERRITE CORE AND A WOUND COIL

(71) Applicant: HiDeep, Inc., Seongnam-si (KR)

(72) Inventor: Mun Sub Byun, Seongnam-si (KR)

(73) Assignee: HIDEEP INC., Seongnam-si (KR)

( * ) Notice: Subject to any disclaimer, the term of this patent is extended or adjusted under 35 U.S.C. 154(b) by 0 days.

(21) Appl. No.: 18/928,374

(22) Filed: Oct. 28, 2024

(65) Prior Publication Data

US 2025/0147602 A1    May 8, 2025

(30) Foreign Application Priority Data

Nov. 8, 2023    (KR) ........................ 10-2023-0153985
Jun. 26, 2024    (KR) ........................ 10-2024-0083913

(51) Int. Cl.
G06F 3/0354        (2013.01)
G06F 3/046         (2006.01)
(52) U.S. Cl.
CPC .......... G06F 3/03545 (2013.01); G06F 3/046 (2013.01)
(58) Field of Classification Search
CPC .............................. G06F 3/03545; G06F 3/046
See application file for complete search history.

(56) References Cited

U.S. PATENT DOCUMENTS 8,847,928 B2     9/2014    Katsurahira
2010/0253648 A1   10/2010    St. Pierre 2011/0115753 A1   5/2011    Katsurahira
2021/0200346 A1   7/2021    Kim et al.
2023/0067179 A1 *  3/2023    Kim ..................... G06F 1/1641
2024/0319817 A1   9/2024    Kim et al.

FOREIGN PATENT DOCUMENTS

| CN | 115244496 | 10/2022 | |
|----|-----------|---------|--|
| JP | 2006-065757 | 3/2006 | |
| JP | 5275959 | 8/2013 | |
| JP | 5974935 | 8/2016 | |
| KR | 10-2022-0133917 | 10/2022 | |
| KR | 10-2023-0147499 | 10/2023 | |
| TW | 201044240 | 12/2010 | |
| WO | WO-2021150045 A1 * | 7/2021 | ........... G06F 1/1643 |

OTHER PUBLICATIONS

D. Sinha et al., "Computation of Inductance and AC Resistance of a Twisted Litz-Wire for High Frequency Induction Cooker", 2010 International Conference on Industrial Electronics, Control and Robotics, Dec. 27-29, 2010.
EPO, Search Report of EP 24210539.3 dated Dec. 13, 2024, total 9 pages.

* cited by examiner

*Primary Examiner* — Lisa S Landis

(74) *Attorney, Agent, or Firm* — LEX IP MEISTER, PLLC

(57)                ABSTRACT

Disclosed is a stylus pen including: a ferrite core; and a coil including a plurality of metal wires twisted to have a number of twist turns per unit length of at least n, and wound on an outer surface of the ferrite core.

20 Claims, 23 Drawing Sheets

| 5N Sample | L | R | Q |
|---|---|---|---|
| 1 | 118.56 | 2.45 | 182.78 |
| 2 | 118.51 | 2.44 | 183.14 |
| 3 | 122.17 | 2.5 | 184.46 |
| Average | 119.75 | 2.46 | 183.5 |

FIG. 15

| 15N Sample | L | R | Q |
|------------|--------|------|--------|
| 1 | 119.94 | 2.24 | 202.09 |
| 2 | 118.85 | 2.27 | 197.01 |
| 3 | 122.29 | 2.26 | 203.72 |
| Average | 120.36 | 2.26 | 200.9 |

FIG. 23

|  | Sample 1 | Sample 2 |
|---|---|---|
| Twisted Turn | 15 | 0 |
| Winding method | Stack up | Zigzag |
| Q | 200 | 100 |

STYLUS PEN HAVING A FERRITE CORE AND A WOUND COIL

CROSS-REFERENCE TO RELATED APPLICATION

This application claims priority to and the benefit of Korean Patent Application No. 10-2023-0153985 filed in the Korean Intellectual Property Office on Nov. 8, 2023, and Korean Patent Application No. 10-2024-0083913 filed in the Korean Intellectual Property Office on Jun. 26, 2024, the entire contents of which are incorporated herein by reference.

BACKGROUND OF THE INVENTION

(a) Field of the Invention

The present disclosure relates to a stylus pen.

(b) Description of the Related Art

A variety of terminals, such as cell phones, smart phones, tablet PCs, laptop computers, digital broadcast terminals, personal digital assistants (PDAs), portable multimedia players (PMPs), and navigation systems, are equipped with touch sensors.

Within these terminals, the touch sensor may be positioned on a display panel that displays an image, or may be positioned on an area of a terminal body. By allowing a user to interact with the terminal by touching the touch sensor, the terminal may provide an intuitive user interface to the user.

For sophisticated touch input, users may use stylus pens. These stylus pens may transmit and receive signals via touch sensors through electrical and/or magnetic methods.

SUMMARY OF THE INVENTION

The present disclosure attempts to provide a stylus pen for effectively receiving and transmitting a magnetic signal received from an electronic device and a magnetic signal transmitted to an electronic device.

The present disclosure also attempts to provide a stylus pen that increases a Q-value of an inductor.

An exemplary embodiment of the present disclosure provides a stylus pen including: a ferrite core; and a coil including a plurality of metal wires twisted to have a number of twist turns per unit length of at least n, and wound on an outer surface of the ferrite core.

Another exemplary embodiment of the present disclosure provides a touch system including: a stylus pen including an inductor unit including a Litz wire cable including a plurality of metal wires twisted in a rotary form around a portion of a ferrite core, and a capacitor electrically connected to the inductor unit; and a touch screen including a touch electrode layer receiving a resonated electromagnetic signal from the stylus pen.

Still another exemplary embodiment of the present disclosure provides a stylus pen including: an inductor unit including a coil wound on a portion of a ferrite core in a plurality of steps, and including a plurality of metal wires twisted in a rotary form; and a capacitor unit electrically connected with the coil.

BRIEF DESCRIPTION OF THE DRAWINGS

FIG. 10 is a diagram illustrating the number of twist turns of a coil.

FIG. 14 is a diagram illustrating inductance, resistance, and Q-values of the inductor unit including the coil according to the comparative example.

FIG. 15 is a diagram illustrating inductance, resistance, and Q-values of the inductor unit including the coil according to the exemplary embodiment.

FIG. 23 is a diagram illustrating the Q-value according to the number of twist turns and the winding scheme.

DETAILED DESCRIPTION OF THE EXEMPLARY EMBODIMENTS

Figure 1:
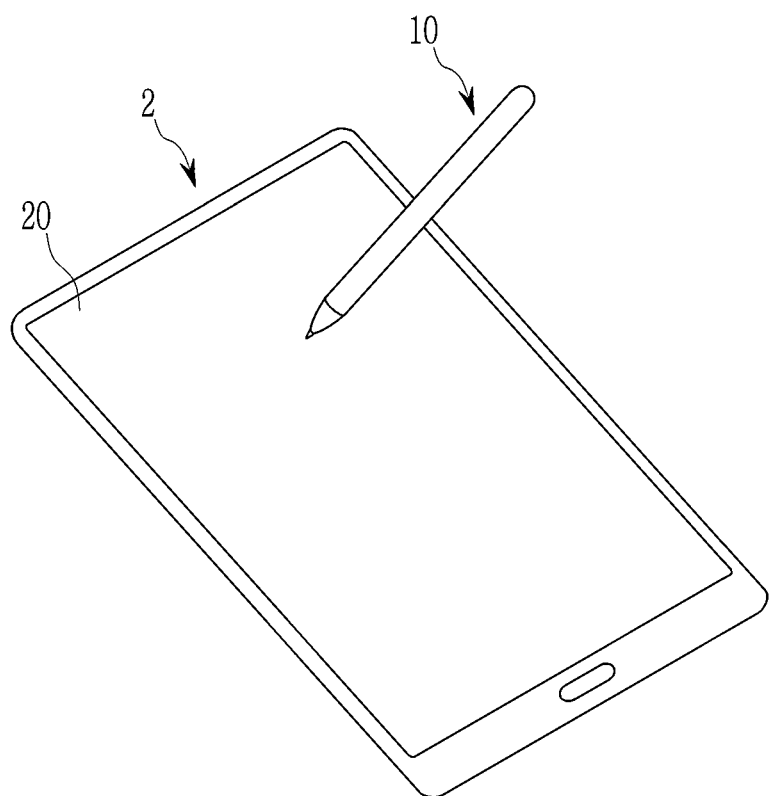
FIG. 1 is a conceptual diagram illustrating a stylus pen and an electronic device.

In the following detailed description, only certain exemplary embodiments of the present disclosure have been shown and described, simply by way of illustration. As those skilled in the art would realize, the described exemplary embodiments may be modified in various different ways, all without departing from the spirit or scope of the present disclosure.

Accordingly, the drawings and description are to be regarded as illustrative in nature and not restrictive. Like reference numerals designate like elements throughout the specification.

In addition, the size and thickness of each configuration illustrated in the drawings are arbitrarily illustrated for understanding and ease of description, but the present disclosure is not limited thereto. In the drawings, the thickness of layers and regions are exaggerated for clarity. In the drawings, for understanding and ease of description, the thickness of some layers and areas is exaggerated.

It will be understood that when an element such as a layer, film, region, or substrate is referred to as being "on" another element, it may be directly on the other element or intervening elements may also be present. In contrast, when an element is referred to as being "directly on" another element, there are no intervening elements present. Further, it will be understood that when an element such as a layer, film, region, or substrate is referred to as being "on" another element, it may be directly on the other element or intervening elements may also be present.

Throughout the specification, unless explicitly described to the contrary, the word "comprise", and variations such as "comprises" or "comprising", will be understood to imply the inclusion of stated elements but not the exclusion of any other elements.

Further, in the entire specification, when it is referred to as on a plan view", it means when a target part is viewed from above, and when it is referred to as "in a cross-sectional view", it means when the cross-section obtained by cutting a target part vertically is viewed from the side.

In addition, expressions written in the singular may be construed in the singular or plural unless an explicit expression such as "a" or "single" is used. Terms including an ordinary number, such as first and second, are used for describing various constituent elements, but the constituent elements are not limited by the terms. These terms may be used to distinguish one component from another component.

The following examples will further illustrate the present disclosure. These examples are intended to illustrate the disclosure only and are not intended to limit the scope of the rights protected by the disclosure.

FIG. 1 is a conceptual diagram illustrating a stylus pen and an electronic device.

Referring to FIG. 1, the stylus pen 10 may receive a signal output from an electronic device 2 or a touch screen 20 near the touch screen 20 of the electronic device 2, and may transmit the signal to the touch screen 20.

Figure 2:
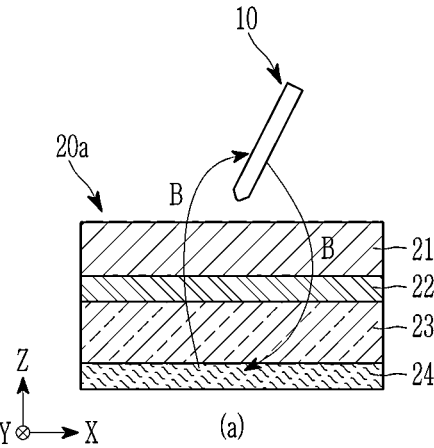
FIG. 2 is a diagram schematically illustrating a signal transmission operation between a stylus pen and an electronic device.

FIG. 2 is a diagram schematically illustrating a signal transmission operation between the stylus pen and the electronic device.

Referring to FIG. 2, a touch screen 20a may include a window 21, a touch electrode layer 22, a display panel 23, and a digitizer 24.

Among the passive stylus pens, in the electro-magnetic resonance (EMR) stylus pen 10, when the digitizer 24 delivers a magnetic signal B to the EMR stylus pen 10, a resonant circuit included in the stylus pen 10 resonates to the magnetic signal B. The digitizer 24 may receive input of the resonant magnetic signal B from the stylus pen 10.

The digitizer 24 may be attached below the display panel 23, and may include a flexible printed circuit board (FPCB) having a plurality of conductive antenna loops a ferrite sheet to shield the magnetic field generated by the antenna loops, and block eddy currents that may be generated by other electrical elements when the antenna loops form a magnetic field.

The FPCB may be formed of a plurality of layers of the plurality of antenna loops for detecting a location where a resonant signal is input. One antenna loop may be superimposed in the z-axis direction with at least one other antenna loop. As a result, the thickness of the FPCB may be increased, which may make miniaturization of the electronic device 2 (in FIG. 1) including the digitizer 24 difficult.

In some exemplary embodiments, when the digitizer 24 is mounted on the foldable/flexible electronic device 2, the FPCB attached to the folding area may be deformed. Repeated folding may stress the wiring elements forming the antenna loop, which may eventually cause damage to the wiring elements. Furthermore, the folding of the electronic device 2 may cause deformation of the ferrite sheet.

Figure 3:
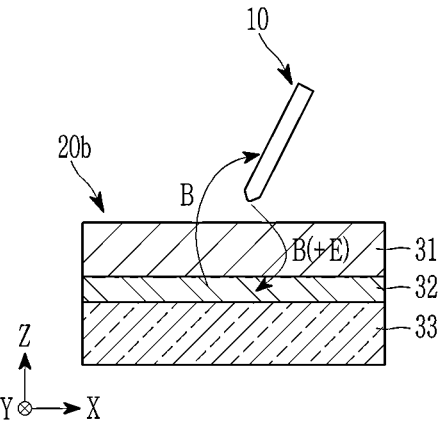
FIG. 3 is a diagram schematically illustrating a signal transmission operation between the stylus pen and the electronic device.

FIG. 3 is a diagram schematically illustrating a signal transmission operation between the stylus pen and the electronic device.

In the case of the stylus pen 10 including a resonant circuit, when the electrode of the touch electrode layer 32 delivers the magnetic signal B to the stylus pen 10, the resonant circuit included in the stylus pen 10 may resonate based on the magnetic signal B. The electrode of the touch electrode layer 32 may receive the resonated magnetic signal from the stylus pen 10.

Compared to the touch screen 20a in FIG. 2, a touch screen 20b does not require an additional unit or module, such as the digitizer 24 in FIG. 2, to transmit the magnetic signal to the stylus pen 10, which may further decrease the thickness of the touch screen 20b. Also, the touch screen 20b may be advantageous over the touch screen 20a in terms of manufacturing cost, as the touch screen 20b does not utilize the expensive digitizer 24.

However, the internal resistance of the touch electrode layer 32 may be greater than the internal resistance of the digitizer 24. In general, the internal resistance of the touch electrode layer 32 may be 10 or more times greater than the internal resistance of the digitizer 24, such that the drive current flowing to the touch electrode layer 32 may be 10 or more times lower than the drive current flowing to the digitizer 24.

When the drive current flowing to the touch electrode layer 32 is lowered, the magnetic signal that the stylus pen 10 receives from the touch electrode layer 32 may be lowered, and thus the resonant signal generated by the stylus pen 10 may also be lowered.

The structure of the stylus pen 10 to supplement the lower magnetic signal delivered to the stylus pen 10 due to the resistance of the touch electrode layer 32 will be described below.

Figure 4:
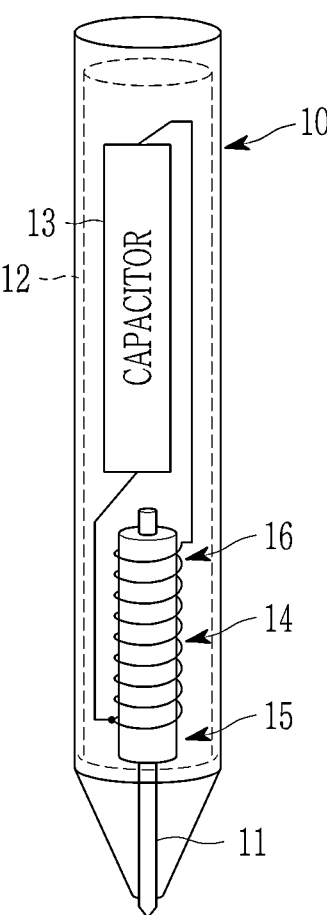
FIG. 4 is a diagram illustrating a stylus pen.

FIG. 4 is a diagram illustrating the stylus pen.

Referring to FIG. 4, the stylus pen 10 includes a resonant circuit unit 12 within the housing. The resonant circuit unit 12 is an LC resonant circuit, which may resonate with a driving signal output from the touch screen 20. The driving signal may include a signal (e.g., a sine wave, or a square wave) having a frequency corresponding to the resonance frequency of the resonant circuit unit 12. For resonance, the resonant frequency of the resonant circuit unit 12 and the frequency of the driving signal need to be the same or very similar. The resonant frequency of the stylus pen 10 may be based on the design value of the resonant circuit unit 12 of the stylus pen 10. When the touch electrode layer 32 in FIG. 3 generates a magnetic field caused by the driving signal, the resonant circuit unit 12 of the stylus pen 10 may resonate using the signal received through the change in the magnetic field.

The elements of the stylus pen 10 may be housed in a housing. The housing may have the shape of a cylinder, a polygonal column, a column with at least a portion of its surface curved, an entasis, a frustum of pyramid, a circular truncated cone, or the like, but is not limited to the foregoing shape. The housing is hollow on the inside, so that the housing may accommodate the elements of the stylus pen 10, such as the resonant circuit unit 12, within its interior. The housing may be made of a non-conductive material.

As shown in FIG. 4, the EMR stylus pen 10 may include a core body 11 and a resonant circuit unit 12. The resonant circuit unit 12 may include an inductor unit 14 and a capacitor unit 13. The inductor unit 14 may include a ferrite core 15 through which the core body 11 penetrates and a coil 16 wound on an outer surface of the ferrite core 15.

The core body 11 may have one end, the pen tip, protruding from the ferrite core 15. The core body 11 may be formed of an electrode core made of a conductor, for example a conductive metal, or a rigid resin incorporating a conductive powder.

The ferrite core 15 may have a through hole of a predetermined diameter (e.g., 1 mm) in an axial center direction for insertion of the core body 11 in the ferrite material, for example, in a cylinder shape.

The coil 16 may be wound over the entire length in the axial center direction of the ferrite core 15, or it may be wound over a portion of the length. For example, the coils 16 may be wound on the ferrite core 15 at a spaced distance of 2 mm from opposite side ends in the axial center direction of the ferrite core 15. Further, the coil 16 may be electrically connected to the capacitor unit 13.

The capacitor unit 13 may include a plurality of capacitors connected in parallel. Each capacitor on the printed substrate may have different capacitance and may be trimmed within the manufacturing process.

Figure 5:
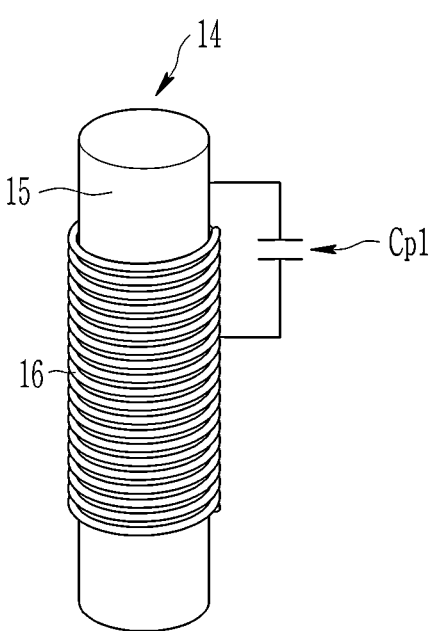
FIG. 5 is a conceptual diagram specifically illustrating an inductor unit of the stylus pen.
Figure 6:
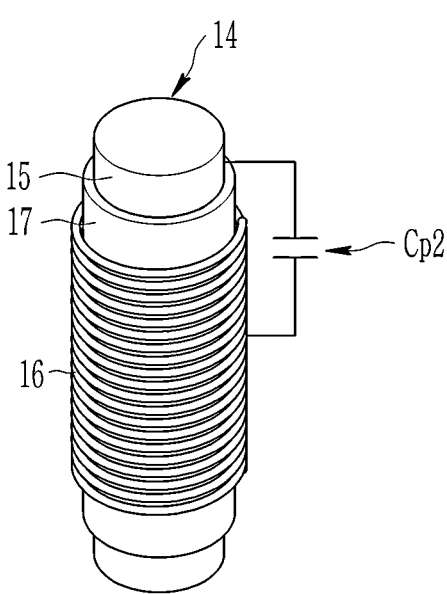
FIG. 6 is a conceptual diagram specifically illustrating the inductor unit of the stylus pen.

FIGS. 5 and 6 are conceptual diagrams illustrating of the inductor unit of the stylus pen in detail.

Referring to FIG. 5, the inductor unit 14 may include a ferrite core 15 and a coil 16 wound on the ferrite core 15. The inductance of the inductor unit 14 is proportional to the magnetic coefficient $\mu$, the cross-sectional area S of the coil 16, and the square of the number of windings N, by $L=\mu SN^2/l$, and is inversely proportional to the length l of the coil 16.

Although the ferrite core 15 is illustrated as having a cylinder shape, the ferrite core 15 may have a polygonal shape, a column shape with at least a portion of its surface curved, an entasis, a frustum of pyramid, a circular truncated cone, or the like, and is not limited to the foregoing shape.

Referring to FIG. 6, the inductor unit 14 may include a ferrite core 15, a bobbin 17 wrapped around at least a portion of the ferrite core 15, and a coil 16 wound around at least a portion of the bobbin 17. The bobbin 17 may be fixed while being in close contact with the ferrite core 15 by force caused by the winding of the coil 16. The bobbin 17 may include plastic or metal with an insulated surface. Specifically, the bobbins 17 may be made of polyphenylene sulfide (PPS), liquid crystal polyester (LCP), polybutylene terephthalate (PBT), polyethylene terephthalate (PET), and phenolic resins.

Due to the high permittivity of the ferrite core 15, parasitic capacitance Cp1 and Cp2 is generated between the ferrite core 15 and the coil 16, and when the bobbin 17 is wrapped around the ferrite core 15 and the bobbin 17 is wound with the coil 16, the distance between the ferrite core 15 and the coil 16 is increased. Therefore, the value of the parasitic capacitance Cp2 in FIG. 6 is smaller than the value of the parasitic capacitance Cp1 in FIG. 5.

Further, the maximum amplitude of the resonant signal generated based on the inductor unit 14 including the parasitic capacitance Cp2 may be larger than the maximum amplitude of the resonant signal generated based on the inductor unit 14 including the parasitic capacitance Cp1.

FIGS. 7 to 10 are diagrams illustrating the number of twist turns of a coil.

Referring to FIGS. 5 to 10, the coil 16 in FIG. 5 may be a Litz wire cable 71, 81, 91, and 101 including six metal wires 1, 2, 3, 4, 5, and 6. The six metal wires 1, 2, 3, 4, 5, and 6 may be twisted in such a way that they rotate along the X direction.

The number of twist turns per unit length of the coil 16 may refer to the number of times the plurality of metal wires 1, 2, 3, 4, 5, and 6 included in the coil 16 are wound on the ferrite core 15 from one point on the outer surface of the ferrite core 15, through another point, and back to the one point, per unit length of the ferrite core 15, relative to a unit length of the ferrite core 15 in FIG. 5.

For example, when one metal wire 1 of the six metal wires 1, 2, 3, 4, 5, and 6 is positioned along the X direction of the ferrite core 15 from one point on the boundary through another point and back to the one point, the number of twist turns of the coil 16 may be increased by +1N.

Figure 7:
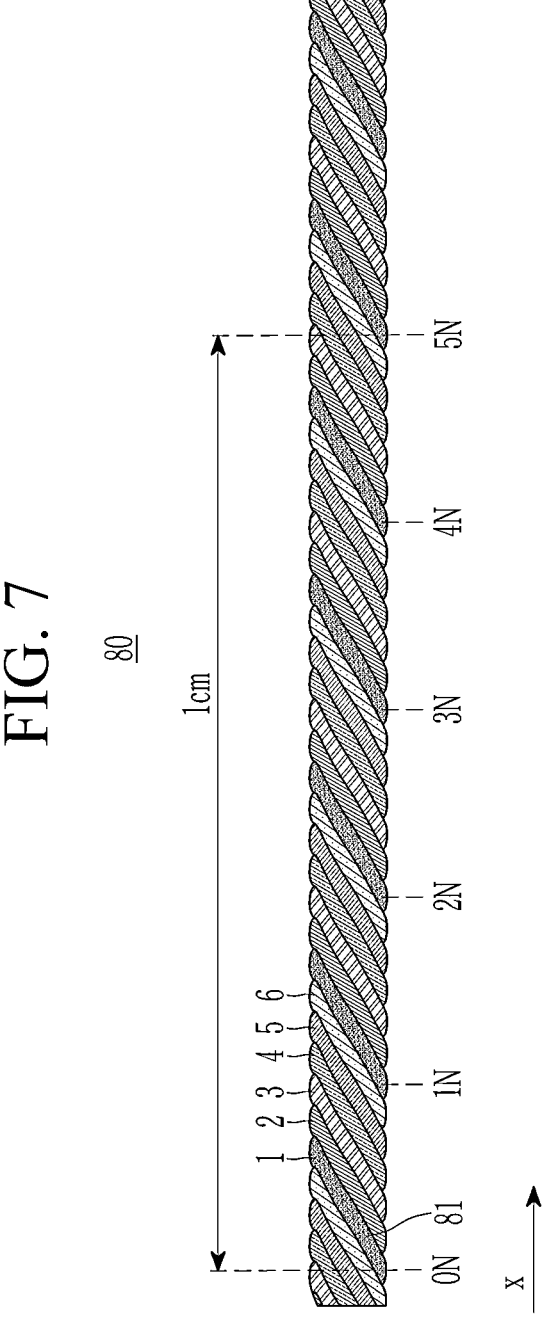
FIG. 7 is a diagram illustrating the number of twist turns of a coil.
Figure 8:
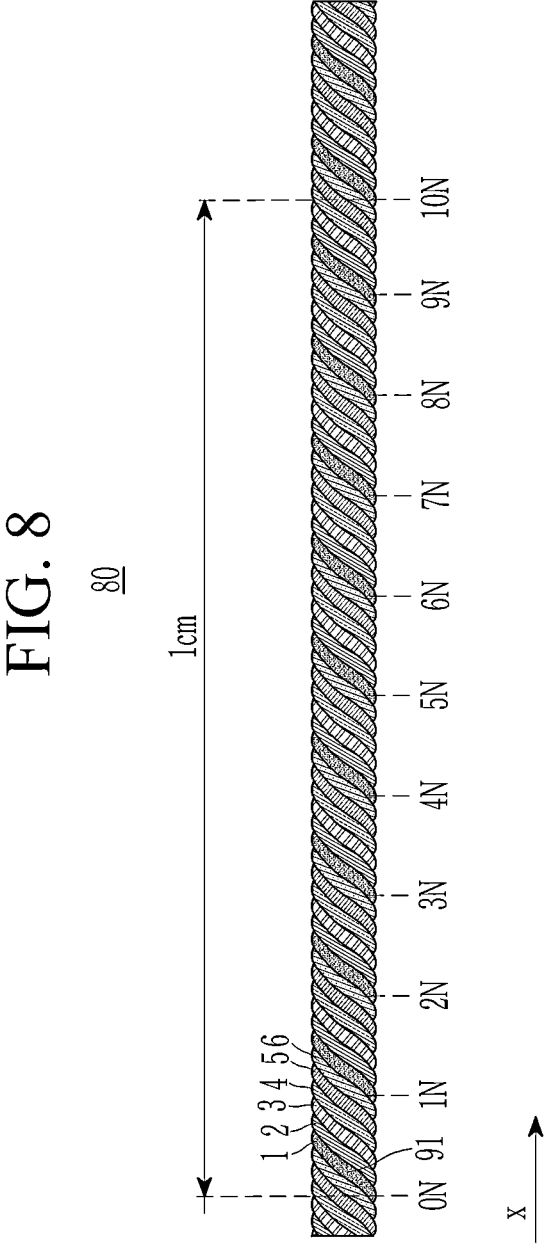
FIG. 8 is a diagram illustrating the number of twist turns of a coil.
Figure 9:
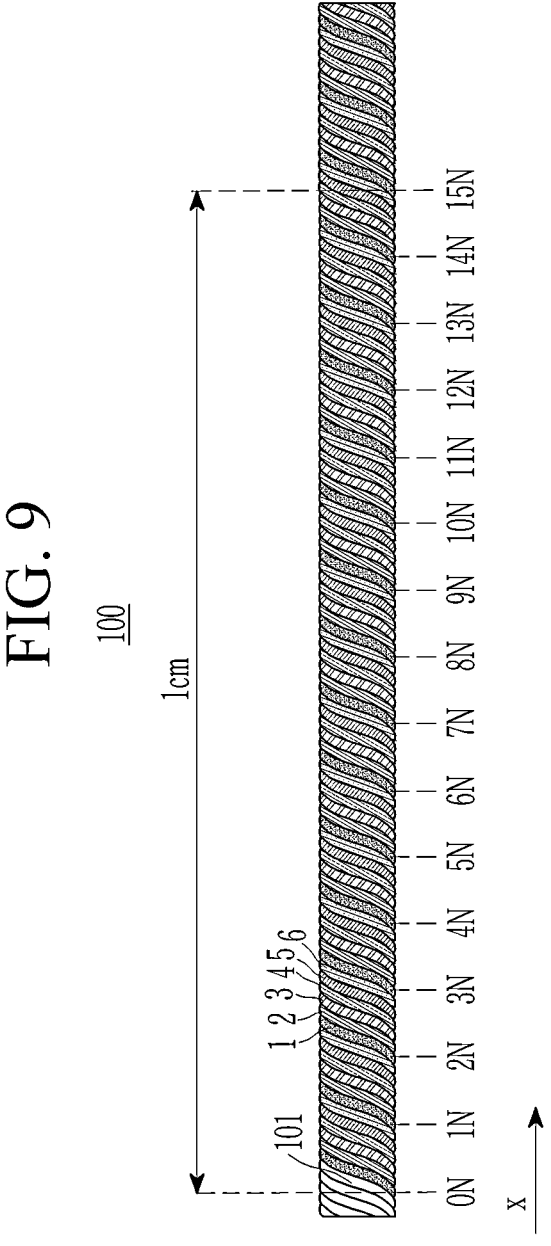
FIG. 9 is a diagram illustrating the number of twist turns of a coil.
Figure 10:
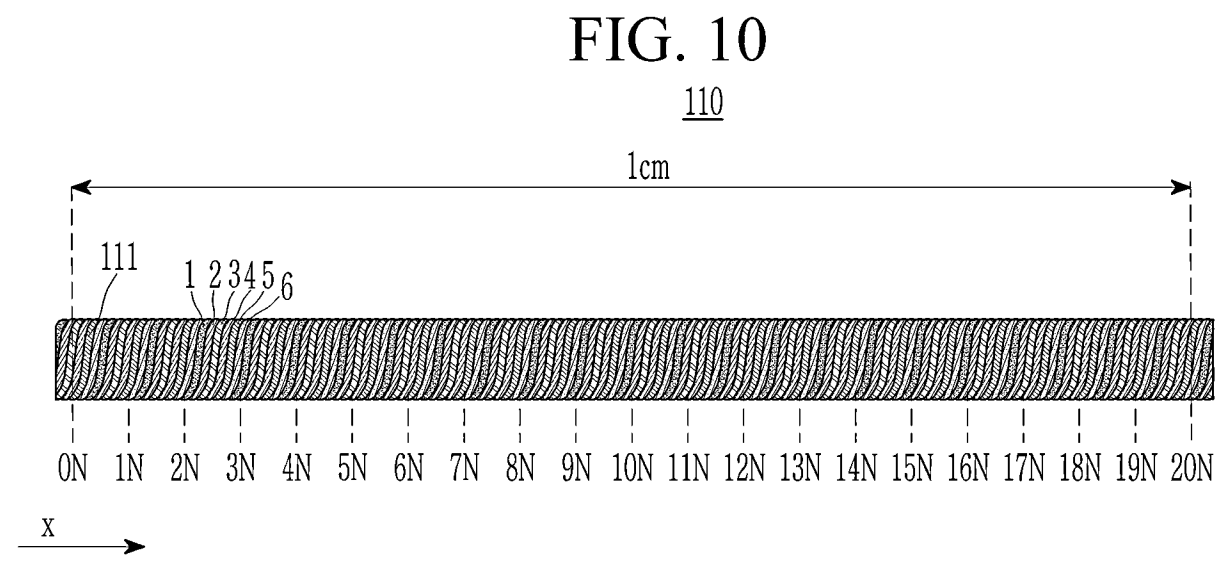

Since the metal wire 1 of FIG. 7 is positioned along the X direction of the Litz wire cable 71 from one point on the boundary through another point and back to the one point five times in 1 cm, the number of twist turns of the coil 16 per unit length may be 5 N/cm Similarly, since the metal wire 1 of FIG. 8 is positioned along the X direction of the Litz wire cable 81 from one point on the boundary through another point and back to the one point ten times in 1 cm, the number of twist turns of the coil 16 per unit length may be 10N/cm. Since the metal wire 1 of FIG. 9 is positioned along the X direction of the Litz wire cable 91 from one point on the boundary through another point and back to the one point 15 times in 1 cm, the number of twist turns of the coil 16 per unit length may be 15N/cm. Since the metal wire 1 of FIG. 10 is positioned along the X direction of the Litz wire cable 101 from one point on the boundary through another point and back to the one point 20 times in 1 cm, the number of twist turns of the coil 16 per unit length may be 20N/cm.

For ease of description, the Litz wire cables 71, 81, 91, and 101, where the number of twist turns of the coil 16 per unit length is iN/cm (where i is a positive integer) will be referred to as iN Litz wire cables. In this case, the number of twist turns of the coil 16 per unit length, and the unit length on which the number of twist turns of coil 16 is based, are for illustrative purposes only.

Figure 11:
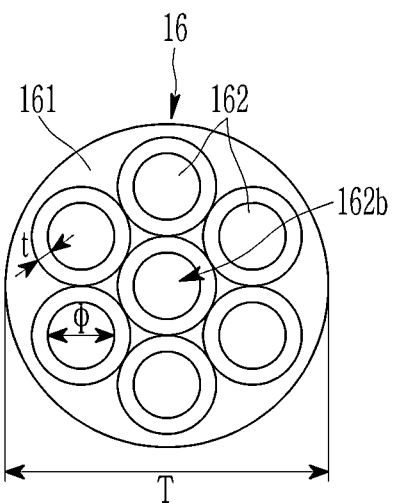
FIG. 11 is a cross-sectional view of a coil according to an exemplary embodiment.

FIG. 11 is a cross-sectional view of the coil according to the exemplary embodiment.

Referring to FIGS. 4 to 10, the coil 16 may be a Litz wire cable including a plurality of metal wires 162 and an insulating sheath layer 161 wrapping the plurality of metal wires 162. The Litz wire cable has each metal wire 162 individually insulated by an insulating layer 163, thereby minimizing the skin effect, which is a phenomenon in which alternating current (AC) flows in concentration near the surface of a conductor. Furthermore, the current flowing within the Litz wire cable may be uniformly distributed across the plurality of metal wires 162, which may reduce interference from magnetic fields.

A diameter T of the coil 16 may vary depending on the number of metal wires 162, the wire diameter $\varphi$ of the metal wire 162, the thickness t of the sheath layer of the metal wires 162, or the thickness of the insulating sheath layer 161.

The dimensions of the Litz wire cable may be specified as N/xx. N may refer to the number of metal wires 162 included in the Litz wire cable, and xx may refer to the wire diameter $\varphi$ of the metal wire 162.

Referring to FIG. 11, the coil 16 may include seven metal wires 162, and of the seven metal wires 162, one central metal wire 162b may be positioned centrally within the coil. Referring to FIGS. 7 to 10, the metal wires 162, except for the central metal wire 162b, may be twisted in a form that rotates along the X direction. However, the central metal wire 162b may not be twisted, but may extend in a straight line along the X direction. Accordingly, the central metal wire 162b may not be included in the metal wires 162 on which the number of twist turns of the coil 16 is based.

Figure 12:
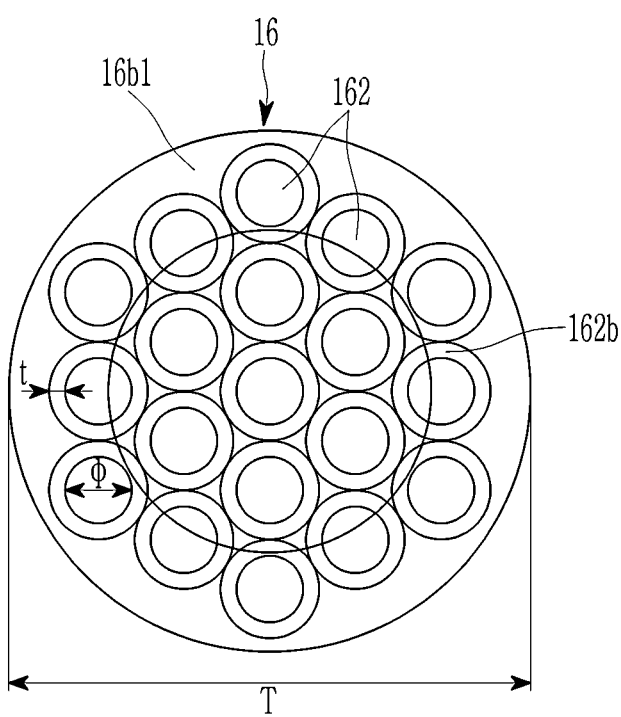
FIG. 12 is a cross-sectional view of a coil according to a comparative example.

FIG. 12 is a cross-sectional view of a coil according to a comparative example.

Referring to FIGS. 4 to 12, the coil 16 may be a Litz wire cable including a plurality of metal wires 162 and an insulating sheath layer 161 wrapped around the plurality of metal wires 162. The Litz wire cable may be a Litz wire cable in which each of the metal wires 162 is individually insulated by an insulating layer 163.

The plurality of metal wires 162 may include seven central metal wires 162b that are centrally positioned within the coil. The metal wires 162, except for the central metal wires 162b, may be twisted in a form that rotates along the X direction. However, the central metal wire 162b may not be twisted, but may extend in a straight line along the X direction. The metal wires 162 on which the number of twist turns of the coil 16 is based include only the outermost metal wire 162, and accordingly, the central metal wire 162b may not be included in the metal wires 162 on which the number of twist turns of the coil 16 is based.

The number of metal wires 162 that the coil includes and the number of metal wires 162 on which the number of twist turns of the coil 16 is based are illustrative only. However, the greater the number of metal wires 162 that the coil includes, the greater the number of central metal wires 162b may be. However, even in this case, the number of twist turns of the coil 16 may be determined based on the outermost metal wires 162, excluding the central metal wire 162b.

Figure 13:
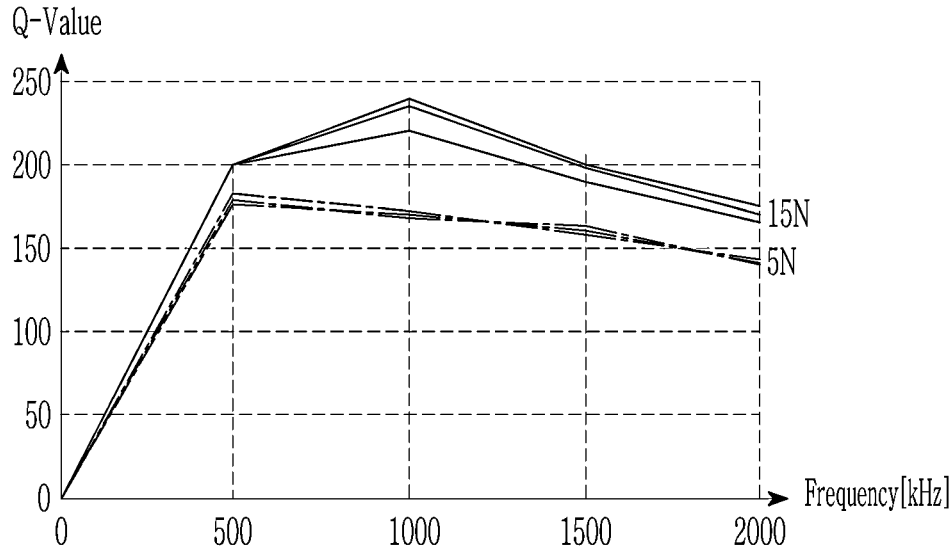
FIG. 13 is a graph illustrating a Q-value depending on a frequency of the inductor unit according to the exemplary embodiment.

FIG. 13 is a graph illustrating a Q-value depending on a frequency of the inductor unit according to the exemplary embodiment.

Specifically, FIG. 13 shows that each of three samples of inductor units 14 (in FIG. 4) including 5N Litz wire cables and three samples of inductor units 14 (in FIG. 4) including 15N Litz wire cables has the Q-value in the frequency band from 0 KHz to 2000 KHz.

Referring to FIG. 13, the Q-value of the sample inductor unit 14 using the 5N Litz wire cable has a maximum value at a frequency of 500 KHz, and the Q-value at 500 kHz may be 175. In the frequency range after 500 kHz, the Q-value of the inductor unit 14 gradually decreases, such that the Q-value of the inductor unit 14 at a frequency of 2000 KHz may be 140. In this case, the Q-values of the three samples of the inductor unit 14 including the 5N Litz wire cable may all be measured similarly.

The Q-value of the inductor unit 14 sample using the 15N Litz wire cable has a maximum value at 1000 KHz, and the Q-value at 1000 KHz may be 230. In the frequency range after 1000 kHz, the Q-value of the inductor unit 14 gradually decreases, such that the Q-value of the inductor unit 14 at a frequency of 2000 kHz may be 170. In this case, the Q-values of the three samples of the inductor unit 14 including the 15N Litz wire cable may all be measured similarly.

In the frequency band from 0 KHz to 2000 kHz, the Q-value of the inductor unit 14 using the 15 N Litz wire cable may be greater than the Q-value of the inductor unit 14 using the 5 N Litz wire cable. Accordingly, the magnitude of the magnetic signal resonating in the stylus pen 10 in FIG. 4 including the inductor unit 14 using the 15N Litz wire cable may be larger than the magnitude of the magnetic signal resonating in the stylus pen 10 including the inductor unit 14 using the 5N Litz wire cable.

The higher the magnitude of the magnetic signal that the touch electrode layer 32 receives from the stylus pen 10, the higher the signal to noise ratio (SNR) may be. A higher SNR means that the magnetic signal that the touch screen 20b of FIG. 3 receives from the stylus pen 10 is less noisy, so the touch electrode layer 32 may accurately detect the position where the stylus pen 10 has touched the touch screen 20b of FIG. 3. Furthermore, as the magnitude of the magnetic signal that the touch screen 20b of FIG. 3 receives from the stylus pen 10 is higher, the magnitude of the minimum voltage of the touch screen 20b to detect the magnetic signal may be smaller, allowing the touch screen 20b to operate at low power. Accordingly, the stylus pen 10 including the inductor unit 14 using the 15N Litz wire cable may enable the touch screen 20b to accurately detect the touch position of the stylus pen 10 than the stylus pen 10 including the inductor unit 14 using the 5N Litz wire cable, and allow the touch screen 20b to operate at low power.

FIG. 14 is a diagram illustrating inductance, resistance, and Q-values of the inductor unit including the coil according to the comparative example, and FIG. 15 is a diagram illustrating inductance, resistance, and Q-values of the inductor unit including the coil according to the exemplary embodiment.

Referring to FIG. 14, the average L-value of the three samples of the inductor unit 14 in FIG. 4 including the 5N Litz wire cable may be 119.75 (H), the average R-value may be 2.46 ($\Omega$), and the average Q-value may be 183.5.

Referring to FIG. 15, the average L-value of the three samples of the inductor unit 14 in FIG. 4 including the 15N Litz wire cable may be 120.36 (H), the average R-value may be 2.26 ($\Omega$), and the average Q-value may be 200.9.

The Q-value of the inductor unit 14 is proportional to frequency F, inductance L, and inversely proportional to resistance R by $2\pi FL/R$. Since the average R-value of the three samples of inductor unit 14 including the 15N Litz wire cable is 2.26($\Omega$) and the average R-value of the three samples of inductor unit 14 including the 5N Litz wire cable is 2.46($\Omega$), the average Q-value of the three samples of inductor unit 14 including the 15N Litz wire cable may be higher than the average Q-value of the three samples of inductor unit 14 including the 5N Litz wire cable. This is because the greater the number of twist turns of the coil (16 in FIG. 5), the lower the resistance R value. Since the number of twist turns of the 15N Litz wire cable is higher than the number of twist turns of the 5N Litz wire cable, the R-value of the inductor unit 14 including the 15N Litz wire cable may be lower than the R-value of the inductor unit 14 including the 5N Litz wire cable. Accordingly, the Q-value of the three samples of the inductor unit 14 including the 15N Litz wire cable may be higher than the Q-value of the three samples of the inductor unit 14 including the 5N Litz wire cable.

Figure 16:
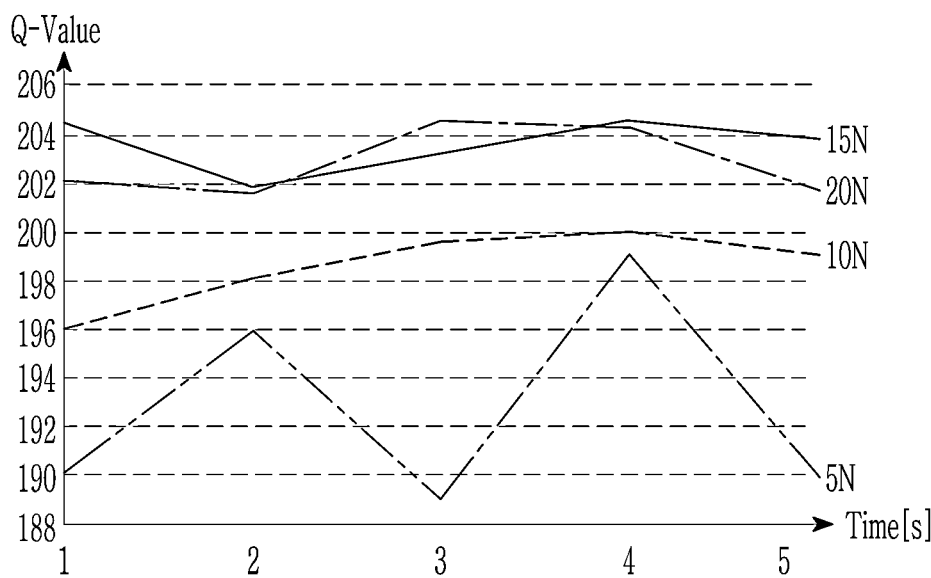
FIG. 16 is a graph illustrating the Q-value of the inductor unit according to the number of twist turns of the coil at a frequency of 600 KHz.

FIG. 16 is a graph illustrating the Q-value of the inductor unit according to the number of twist turns of the coil at a frequency of 600 KHz.

Referring to FIG. 16, the Q-value of the inductor unit 14 of FIG. 4 including the 5N Litz wire cable may have a large variation. As a result of measuring the Q-value of the inductor unit 14 every 1 second for 5 seconds, the Q-value of the inductor unit 14 may be measured to be 190, 196, 189, 199, and 190, respectively. It may be seen that the Q-value of the inductor unit 14 including the 5N Litz wire cable has a larger deviation than the Q-value of the inductor unit 14 including the 10N Litz wire cable, the Q-value of the inductor unit 14 including the 15N Litz wire cable, and the Q-value of the inductor unit 14 including the 20N Litz wire cable. Since the 5N Litz wire cable has a relatively small number of twist turns compared to the 10N, 15N, and 20N Litz wire cables, the metal wires 162 in FIG. 11 of the inductor unit 14 including the 5N Litz wire cable may be distorted, which may cause cold soldering problems when soldering.

As a result of measuring the Q-value of the inductor unit 14 including the 20N Litz wire cable every 1 second for 5 seconds, the Q-value of the inductor unit 14 may be measured to be 202, 201, 205, 204, and 201, respectively. The Q-value of the inductor unit 14 including the 20N Litz wire cable is always measured as 200 or more for 5 seconds, which may be higher than the Q-value of the inductor unit 14 including the 5N Litz wire cable. However, since the 20N Litz wire cable has a relatively large number of twist turns compared to the 5N, 10N, and 15N Litz wire cables, insulation layer breakdown may occur due to the restoring inertia of the metal wire 162 of the inductor unit 14 including the 20N Litz wire cable.

As a result of measuring the Q-value of the inductor unit 14 including the 10N Litz wire cable every 1 second for 5 seconds, the Q-value of the inductor unit 14 may be measured to be 196, 198, 199, 200, and 199, respectively. As a result of measuring the Q-value of the inductor unit 14 including the 15N Litz wire cable every 1 second for 5 seconds, the Q-value of the inductor unit 14 may be measured to be 205, 202, 203, 204, and 204, respectively.

The Q-value of the inductor unit 14 including the 10N Litz wire cable and the Q-value of the inductor unit 14 including the 15N Litz wire cable may be measured close to 200 for 5 seconds. The inductor unit 14 including the 10N Litz wire cable and the inductor unit 14 including the 15N Litz wire cable may have the large number of twist turns than the inductor unit 14 including the 5N Litz wire cable, which may reduce the probability of the metal wire 162 being distorted. The inductor unit 14 including the 10N Litz wire cable and the inductor unit 14 including the 15N Litz wire cable may have the small number of twist turns than the inductor unit 14 including the 20N Litz wire cable, which may reduce the occurrence rate of insulation layer breakdown due to the restoring inertia of the metal wire 162.

Accordingly, the Litz wire cable included in the inductor unit 14 may be the 10N Litz wire cable or the 15N Litz wire cable. However, since the Q-value of the inductor unit 14 including the 15N Litz wire cable measured for 5 seconds is always higher than the Q-value of the inductor unit 14 including the 10N Litz wire cable, it may be more preferable to use the 15N Litz wire cable for the inductor unit 14.

Figure 17:
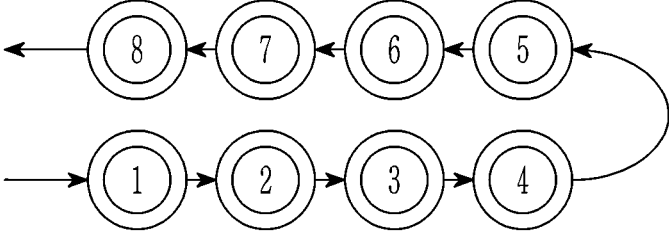
FIG. 17 is a diagram illustrating a U-type winding scheme.

FIG. 17 is a diagram illustrating a U-type winding scheme.

Referring to FIG. 17, the U-type winding scheme is a sequential layer winding scheme in which the winding of the lower layer ends (e.g., 1→2→3→4), and the winding of the layer immediately above is started (e.g., 5→6→7→8). In the U-type winding scheme, the winding of the layer immediately above may start at the point where the winding of the previous layer ends (e.g., point 4). Although the U-type winding scheme is the simplest winding scheme, the length l of the coil may be increased because the winding is done until the end of the winding of the lower layer. As the length l of the coil increases, the inductance may be lowered by $L=\mu SN^2/l$, and the Q-value of the inductor unit 14 in FIG. 4 may be lowered by $2\pi FL/R$.

Figure 18:
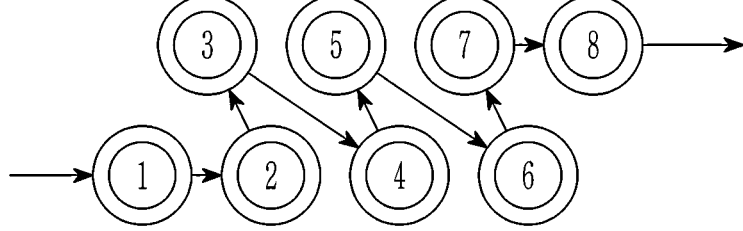
FIG. 18 is a diagram illustrating a zigzag type winding scheme.

FIG. 18 is a diagram illustrating a zigzag type winding scheme.

The zigzag type winding scheme shown in FIG. 18 is an alternate layer winding scheme in which adjacent winding layers are wound alternately, and the windings of adjacent layers are wound in a zigzag pattern. This zigzag-type winding scheme may minimize the voltage difference between the windings of adjacent layers, thereby reducing the winding self-capacitance. However, the winding in the zigzag type winding scheme may cause the structure of the inductor unit 14 in FIG. 4 to become unstable, resulting in a lower Q-value of the inductor unit 14.

Figure 19:
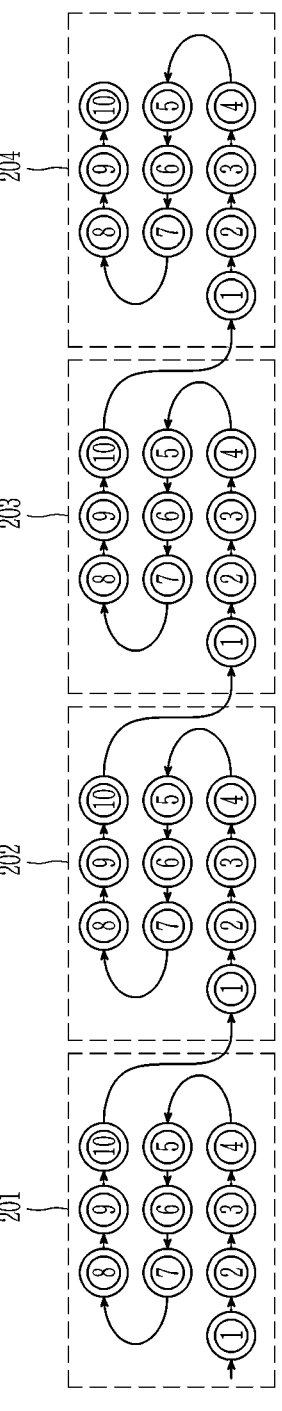
FIG. 19 is a graph representing the Q-value of an inductor unit measured with a E4980A precision LCR meter of KEYSIGHT TECHNOLOGIES while changing frequency.

FIG. 19 is a graph representing the Q-value of the inductor unit measured with a E4980A precision LCR meter of KEYSIGHT TECHNOLOGIES while changing frequency.

Referring to FIG. 19, waveform a is a waveform showing a change in Q-value with the frequency of the inductor unit 14 of FIG. 4 using the U-type winding scheme, and waveform b is a waveform showing a change in Q-value with frequency of the inductor unit 14 using the zigzag-type winding scheme. The Q-value of the inductor unit 14 made by the U-type winding scheme may have a maximum value at a frequency f1 near 150 kHz. The Q-value of the inductor unit 14 made by the zigzag type winding scheme may have a maximum value at a frequency f2 near 100 KHz.

Referring to waveform a and waveform b of FIG. 19, it may be seen that the maximum value of the Q-value of the inductor unit 14 made by the zigzag type winding scheme is about twice as high as the maximum value of the Q-value of the inductor unit 14 made by the U type winding scheme. Therefore, it may be seen that the zigzag type winding scheme is superior to the U type winding scheme for the inductor unit 14 forming the resonant circuit of the stylus pen 10 in FIG. 4.

However, even the maximum value of the Q-value of the inductor unit 14 with the zigzag type winding scheme may not reach a target Q-value. It may be seen that the target Q-value is about twice as high as the maximum Q-value of the inductor unit 14 made by the zigzag type winding scheme.

In some exemplary embodiments, the target Q-value may be 200, and the maximum value of the Q-value of the inductor unit 14 with the zigzag type winding scheme may be 100, and the maximum value of the Q-value of the inductor unit 14 with the U type winding scheme may be 50. In this case, since the magnitude of the magnetic signal resonating in the inductor unit 14 with the zigzag-type winding scheme and the inductor unit 14 with the U-type winding scheme is small, it may be difficult for the touch electrode layer 32 in FIG. 3 to receive the magnetic signal from the inductor unit 14 and to detect the touch position of the stylus pen 10 in FIG. 3 based on the received magnetic signal.

Figure 20:
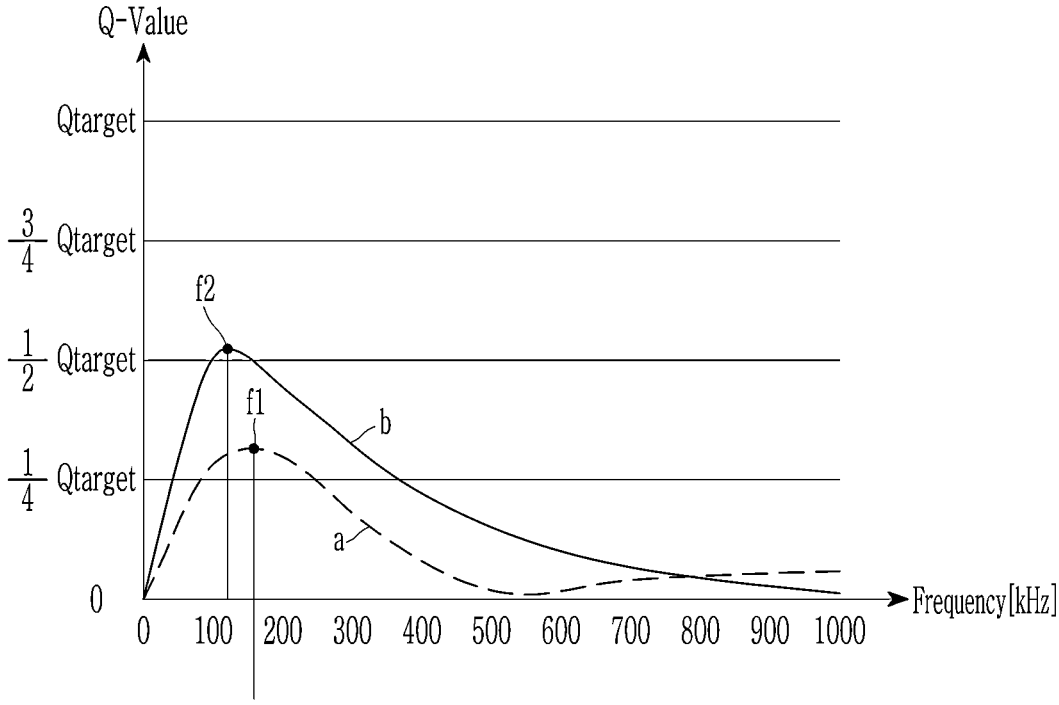
FIG. 20 is a diagram illustrating an N-step type winding scheme.

FIG. 20 is a diagram illustrating an N-step type winding scheme.

Referring to FIG. 20, the N-step type winding scheme may be a type of winding scheme using both the U-type winding scheme and the zigzag type winding scheme. Specifically, the N-step type winding scheme utilizes the sequential layer winding scheme of the U-type winding scheme, in which the winding of the upper layer region is started immediately after the winding of the lower layer region ends, and the winding of the immediately upper layer region is started at the point where the winding of the lower layer region ends. However, the point at which the winding of the lower layer region ends may be different from the U-type winding scheme.

For example, the U-type winding scheme winds the upper layer region when the winding of the lower layer region is completely finished, but the N-step type winding scheme divides the lower layer region into N regions and winds the upper layer region when the winding of each of the N lower layer regions is finished. In this case, there may be multiple upper layer regions, in which case the region may be sequentially wound from the upper layer region closer to the lower layer region.

In addition, the N-step type winding scheme may minimize the voltage difference between adjacent windings by using the zigzag type winding scheme in which adjacent winding layers are alternately wound. However, the alternately wound layer in which the coil is alternately wound may differ from the zigzag-type winding scheme.

For example, in the zigzag-type winding scheme, all adjacent wires are alternately wound, but in the N-step-type winding scheme, of the N segmented winding piles 201, 202, 203, and 204, wire may be wound from region 10 of the third floor of a first winding pile 201 to region 1 of the first floor of a second winding pile 202, wire may be wound from region 10 of the third floor of the second winding pile 202 to region 1 of the first floor of a third winding pile 203, wire may be wound from region 10 of the third floor of the third winding pile 203 to region 1 of the first floor of a fourth winding pile 204.

Figure 22:
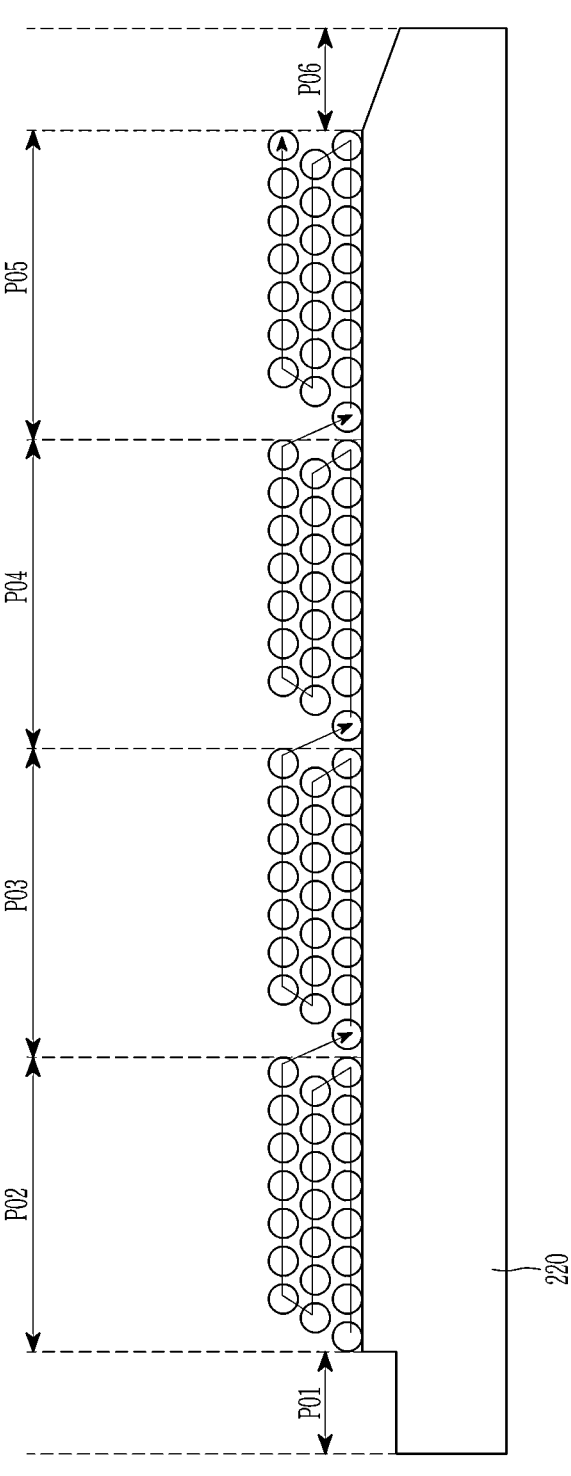
FIG. 22 is a cross-sectional view of an inductor unit of a stylus pen using the N-step type winding scheme.

The number N of steps of the N-step type winding scheme and the number of layers included by each of the winding piles 201, 202, 203, and 204 may vary based on the Q-value of the inductor. However, the number N of steps of the N-step type winding scheme may be at least three or more, considering the target Q-value. The Q-value of the N-step type winding scheme will be described in detail with reference to FIG. 22.

Furthermore, when there are too many steps in the N-step type winding scheme, the structure may become unstable, which may affect the Q-value deterioration. Accordingly, the number N of steps of the N-step type winding scheme may be at most 10 or less.

Figure 21:
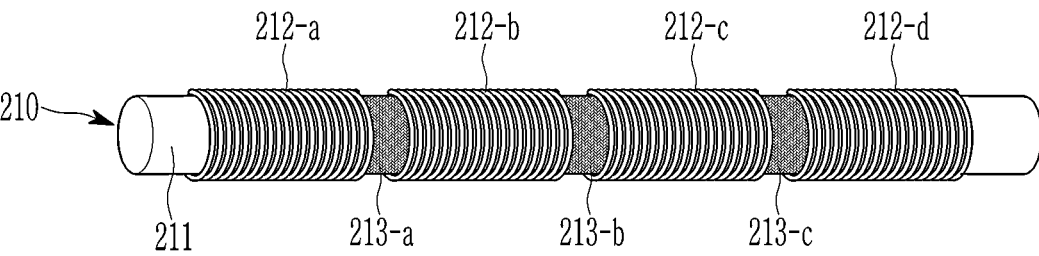
FIG. 21 is a conceptual diagram illustrating an inductor unit of a stylus pen using the N-step type winding scheme.

FIG. 21 is a conceptual diagram of an inductor unit of a stylus pen using the N-step type winding scheme.

Referring to FIG. 21, the inductor unit 210 may include a ferrite core 211 and may include four winding piles 212-*a*, 212-*b*, 212-*c*, and 212-*d* winding the ferrite core 211. In some exemplary embodiments, the four winding piles 212-*a*, 212-*b*, 212-*c*, and 212-*d* may wind the bobbin 17 in FIG. 6 that wraps around at least a portion of the ferrite core 211.

The inductor unit 210 may include a first winding connection region 213-*a* connected between the first winding pile 212-*a* and the second winding pile 212-*b*, a second winding connection region 213-*b* connected between the second winding pile 212-*b* and the third winding pile 212-*c*, and a third winding connection region 213-*c* connected between the third winding pile 212-*c* and the fourth winding pile 212-*d*.

The first winding connection region 213-*a* is the region where region 10 of the third floor of the first winding pile 201 in FIG. 20 and region 1 of the first floor of the second winding pile 202 in FIG. 20 are connected, the second winding connection region 213-*b* is the region where region 10 of the third floor of the second winding pile 202 and the region 1 of the first floor of the third winding pile 203 of FIG. 20 are connected, the third winding connection region 213-*c* may be a region where region 10 of the third floor of the third winding pile 203 and region 1 of the first floor of the fourth winding pile 204 in FIG. 20 are connected.

FIG. 21 is a cross-sectional view of an inductor unit of a stylus pen using the N-step type winding scheme.

Referring to FIG. 21, a left region P01 of a ferrite core 220 of the inductor unit 14 in FIG. 4 may be adjacent to the core body 11 in FIG. 4, and a right region P06 of the ferrite core 220 may be adjacent to the capacitor 13 in FIG. 4. The coil 16 in FIG. 4 may be wound on the ferrite core 220 at a separation distance of 2 mm from the left region P01 and the right region P06 of the ferrite core 220 of the inductor unit. Accordingly, current flowing in the coil 16 may not leak into the core body 11 or the capacitor 13.

The ferrite core 220 may be separated into a plurality of regions at regular intervals relative to an axial center direction of the ferrite core 220, and the coils may be individually wound on the plurality of regions. For example, region P02 is a first winding pile region in which the first winding pile 201 in FIG. 20 is wound on the ferrite core 220, region P03 is the second winding pile region in which the second winding pile 202 in FIG. 20 is wound on the ferrite core 220, region P04 is a third winding pile region in which the third winding pile 203 in FIG. 20 is wound on the ferrite core 220, and region P05 may be a fourth winding pile region in which the fourth winding pile 204 in FIG. 20 is wound on the ferrite core 220.

FIG. 23 is a diagram illustrating the Q-value according to the number of twist turns and the winding scheme.

Referring to FIGS. 16, 20, and 23, sample 1 may be the inductor unit 14 of FIG. 4 using the 15N Litz wire cable and the N-step type winding scheme, and sample 2 may be the inductor unit 14 of FIG. 4 using the 0N Litz wire cable and the zigzag type winding scheme.

Sample 1 using the 15N Litz wire cable and the N-step type winding scheme may have a Q-value of 200. On the other hand, Sample 2 using the 0N Litz wire cable and the zigzag-step type winding scheme may have a Q-value of 150. The Q-value of Sample 1, which is configured based on the number of 15 N twist turns of the Litz wire cable and the N-step type winding scheme may be greater than the Q-value of Sample 2, which is configured based on no twist turns of the Litz wire cable or the zigzag type winding scheme.

Since the stylus pen 10 in FIG. 3 including the inductor unit 14 of sample 1 has the larger Q-value than the stylus pen 10 including the inductor unit 14 of sample 2, the magnitude of the magnetic signal resonating in the inductor unit 14 of sample 1 may be larger than the magnitude of the magnetic signal resonating in the inductor unit 14 of sample 2.

As the touch electrode layer 32 in FIG. 3 receives a higher magnitude of the magnetic signal from the stylus pen 10, the touch electrode layer may accurately detect the position where the stylus pen 10 has touched the touch screen 20*b* in FIG. 3. Furthermore, as the magnitude of the magnetic signal that the touch screen 20*b* of FIG. 3 receives from the stylus pen 10 is higher, the magnitude of the minimum voltage of the touch screen 20*b* to detect the magnetic signal may be smaller, allowing the touch screen 20*b* to operate at low power.

Accordingly, the stylus pen 10 including the inductor unit 14 of Sample 1 may enable the touch screen 20*b* to accurately detect the touch position of the stylus pen 10, compared to the stylus pen 10 in FIG. 3 including the inductor unit 14 of Sample 2, and enable the touch screen 20*b* to operate at low power.

Although an exemplary embodiment of the present disclosure has been described in detail, the scope of the present disclosure is not limited by the exemplary embodiment. Various changes and modifications using the basic concept of the present disclosure defined in the accompanying claims by those skilled in the art shall be construed to belong to the scope of the present disclosure.

What is claimed is:

1. A stylus pen comprising:
a ferrite core; and
a coil including a plurality of metal wires twisted to have a number of twist turns per unit length of 10 to 15 turns/cm, and wound on an outer surface of the ferrite core.

2. The stylus pen of claim 1, wherein:
the number of twist turns per unit length is the number of times the plurality of metal wires are wound from one point on the outer surface of the ferrite core through another point and back to the one point.

3. The stylus pen of claim 2, wherein:
the plurality of metal wires includes a central metal wire positioned at an inner center of the coil and a plurality of outer metal wires positioned at an inner periphery of the coil, and
the number of twist turns per unit length is the number of times the plurality of outer metal wires are wound from the one point on the outer surface of the ferrite core through the another point and back to the one point.

4. The stylus pen of claim 2, wherein:
the plurality of metal wires includes a plurality of central metal wires positioned at an inner center of the coil and a plurality of outer metal wires positioned at an inner periphery of the coil, and
the number of twist turns per unit length is the number of times the plurality of outer metal wires are wound from the one point on the outer surface of the ferrite core through the another point and back to the one point.

5. The stylus pen of claim 2, wherein:
the coil is wound while having a spaced distance from each of opposite ends of the ferrite core in an axial center direction.

6. The stylus pen of claim 5, wherein:
the ferrite core is separated into a plurality of regions at regular intervals, relative to the axial center direction of the ferrite core, and the coils are individually wound on the plurality of regions.

7. The stylus pen of claim 6, wherein:
each of the plurality of regions includes a lower layer region and an upper layer region disposed on top of the lower layer region, and when the winding of the lower layer region ends and the winding of the upper layer region starts.

8. The stylus pen of claim 7, wherein:
the upper layer region includes a first upper layer region and a second upper layer region,
the first upper layer region is disposed on top of the lower layer region, and
the second upper layer region is disposed on top of the first upper layer region.

9. The stylus pen of claim 7, wherein:
the coil is wound on a bobbin wrapped around at least a portion of the ferrite core.

10. A touch system comprising:
a stylus pen including an inductor unit including a Litz wire cable including a plurality of metal wires twisted to have a number of twist turns per unit length of 10 to 15 turns/cm, in a rotary form around a portion of a ferrite core, and a capacitor electrically connected to the inductor unit; and
a touch screen including a touch electrode layer receiving a resonated electromagnetic signal from the stylus pen.

11. The touch system of claim 10, wherein:
the plurality of metal wires is twisted in a rotary form around a portion of the ferrite core while having a spaced distance from each of opposite ends of the ferrite core in an axial center direction.

12. The touch system of claim 11, wherein:
the ferrite core is separated into a plurality of regions at regular intervals, relative to the axial center direction of the ferrite core, and
the Litz wire cables are individually wound on the plurality of regions.

13. The touch system of claim 12, wherein:
each of the plurality of regions includes a lower layer region and an upper layer region disposed on top of the lower layer region, and when the winding of the lower layer region ends and the winding of the upper layer region starts.

14. The touch system of claim 13, wherein:
the Litz wire cable is wound around a first connection region that connects a first region, which is any one of the plurality of regions, and a second region adjacent to the first region.

15. The touch system of claim 14, wherein:
the first connection region includes a connection region in which an upper layer region of the first region is connected with a lower layer region of the second region by the Litz wire cable.

16. The touch system of claim 15, wherein:
the Litz wire cable is wound around a bobbin wrapped around at least a portion of the ferrite core.

17. A stylus pen comprising:
an inductor unit including a coil wound on a portion of a ferrite core in a plurality of steps, and including a plurality of metal wires twisted to have a number of twist turns per unit length of 10 to 15 turns/cm, in a rotary form; and
a capacitor unit electrically connected with the coil.

18. The stylus pen of claim 17, wherein:
the coil wound on the portion of the ferrite core in the plurality of steps wound in a plurality of winding pile regions in which the ferrite core is wound and a plurality of winding connection regions connecting each of the plurality of winding pile regions.

19. The stylus pen of claim 18, wherein:
the plurality of winding pile regions is a region in which the ferrite core is separated into a plurality of regions and is wound with the coil while having a spaced distance from each of opposite ends of the ferrite core in an axial center direction, and each of the plurality of regions includes a plurality of layers around which the coil is wound.

20. The stylus pen of claim 19, wherein:
the plurality of winding connection regions connects a first winding pile region, which is any one winding pile region among the plurality of winding file regions, and a second winding pile region adjacent to the first winding pile region, and connects a first layer, which is the highest layer of a plurality of layers included in the first winding pile region, and a second layer, which is the lowest layer of a plurality of layers included in the second winding pile region.

\* \* \* \* \*